United States Patent [19]

Speer et al.

[11] Patent Number: 5,330,571
[45] Date of Patent: Jul. 19, 1994

[54] INCLUSION PIGMENTS OF ZIRCONIUM SILICATE WITH INCLUDED CHROMIC OXIDE, A PROCESS FOR THE PREPARATION AND USE THEREOF

[75] Inventors: Dietrich Speer, Hanau; Akos Kiss, Alzenau-Wasserlos; Peter Kleinschmit, Hanau; Jenny Horst, Gelnhausen; Christel Zell, Rodenbach, all of Fed. Rep. of Germany

[73] Assignee: Degussa Aktiengesellschaft, Frankfurt am Main, Fed. Rep. of Germany

[21] Appl. No.: 847,498

[22] Filed: Mar. 12, 1992

[30] Foreign Application Priority Data

Mar. 16, 1991 [DE] Fed. Rep. of Germany ....... 4108624

[51] Int. Cl.⁵ .............................................. G08K 3/00
[52] U.S. Cl. ................................... 106/450; 106/400; 106/453; 106/454; 106/481; 427/215
[58] Field of Search ................ 427/215; 106/400, 450, 106/453, 454, 481

[56] References Cited

U.S. PATENT DOCUMENTS

| 3,577,252 | 5/1971 | Brugger | 106/450 |
|---|---|---|---|
| 4,874,433 | 10/1989 | Kiss et al. | 106/450 |
| 5,008,223 | 4/1991 | Speer et al. | 106/450 |
| 5,019,169 | 5/1991 | Speer et al. | 106/438 |
| 5,021,092 | 6/1991 | Speer et al. | 106/451 |
| 5,035,746 | 7/1991 | Speer et al. | 106/438 |
| 5,043,016 | 8/1991 | Speer et al. | 106/450 |

FOREIGN PATENT DOCUMENTS

| 688253 | 12/1965 | Belgium . |
|---|---|---|
| 2312535 | 11/1973 | Fed. Rep. of Germany . |
| 3719051 | 11/1988 | Fed. Rep. of Germany . |
| 3827068 | 3/1990 | Fed. Rep. of Germany . |
| 3906821 | 3/1990 | Fed. Rep. of Germany . |
| 3906818 | 9/1990 | Fed. Rep. of Germany . |
| 3906819 | 9/1990 | Fed. Rep. of Germany . |
| 3931092 | 3/1991 | Fed. Rep. of Germany . |
| 4002564 | 8/1991 | Fed. Rep. of Germany . |
| 983175 | 2/1965 | United Kingdom . |
| 1121524 | 7/1968 | United Kingdom . |

OTHER PUBLICATIONS

Van Arno Broll et al., Chaniker Zeitung, vol. 101, Jul./Aug. 1977, pp. 319-323.
Transactions of British Ceramic Society, Bd. 8, No. 5 (2298/69) dated Sep. 1969.
Chemical Abstracts, vol. 94, No. 20, dated May 18, 1981, No. 94:161346y.

Primary Examiner—Helene Klemarski
Assistant Examiner—Michael Marcheschi
Attorney, Agent, or Firm—Beveridge, DeGrandi, Weilacher & Young

[57] ABSTRACT

Inclusion pigments are discolored having zirconium silicate as a casing component and chromium (III) oxide ($Cr_2O_3$) as a discrete, included color compound. The included $Cr_2O_3$ has a $D_{50}$ value in the range of 0.1 to 3.0 μm and a brilliant light green color. Contrary to non-included $Cr_2O_3$ of identical value, the pigments of the present invention may be used for the preparation of decorations without problems and difficulties in their application and maintaining sharp lines and contours. The pigments are suitable for direct pressing and high temperature firing processes. They are prepared by fusing a mixture of zirconium dioxide, silicon dioxide, mineralizators and chromium oxide.

11 Claims, No Drawings

INCLUSION PIGMENTS OF ZIRCONIUM
SILICATE WITH INCLUDED CHROMIC OXIDE, A
PROCESS FOR THE PREPARATION AND USE
THEREOF

BACKGROUND OF THE INVENTION

The present invention relates to inclusion pigments having zirconium silicate as a casing component and an inorganic metal oxide having a fine particle size as an included color compound, wherein chromic oxide having a well-defined particle size is used as the inorganic metal oxide.

Furthermore, the present invention is directed to a process for forming the inclusion pigments which includes adding chromic oxide into zirconium silicate formed in a solid phase reaction.

The invention further relates to the use of inclusion pigments for the preparation of brilliant light green ceramic decorations.

Green chromic oxide ($Cr_2O_3$) has long been used, due to its relatively good color and enamel stability, as a pigment for the coloring of ceramic masses and enamels, and also as a lower enamel color and a component of decoration colors in the preparation of ceramic decorations.

Brilliant light green shades of color are particularly desirable. As is the case with many other pigments, the shade of color of chromic oxide depends upon its average particle diameter ($D_{50}$ value) and also upon the distribution of particle sizes. Desirable brilliant light green shades of color are obtained by using chromic oxide having an average particle size in the range of 0.1 to 3.0 μm. In the CIE-Lab-system (German Industrial Standards Nos. 5033, 6164 and 6174), such chromic oxides show a color value in the range of L=30 to 35, a=−15 to −17 and b=13 to 16, measured with a 5% by weight coloration in a transparent enamel and by burning or firing at 1060° C. Under identical test conditions, chromic oxide of a crude particle size gives color values of L=20 to 25, a=−12 to −14 and b=9 to 12. However, these chromic oxides having a crude particle size are not only of a darker color, but they also show a blue shade. This fact often represents a drawback.

Dark green chromic oxide having a crude particle size can be transformed into a light green pigment of fine particle size by grinding. Although the pigments thus obtained have the desired color, they have drawbacks from the standpoint of the technology of their application. More particularly, such pigments are less suitable for direct pressing in the preparation of ceramic decorations, due to their fine particle size. The fine details of the decorations are often smudged and/or the application of the decoration onto the ceramic carrier to be colored is imperfect. Non-included chromic oxide is susceptible to oxidation and formation of chromate in the lower enamel decoration, particularly at higher firing temperatures, and this results in drain traces during firing.

SUMMARY OF THE INVENTION

The object of the invention is to provide new pigments based on chromic oxide which are a brilliant light green color shade and which do not show the above drawbacks during the course of preparation of ceramic decorations by direct pressing.

It has been found that brilliant light green chromic oxide having a fine particle size can be converted into inclusion pigments with a zirconium silicate casing, and thus improve the technological properties of the pigment with respect to its use and application.

The present invention is directed to inclusion pigments having zirconium silicate as a casing substance and an inorganic oxide having a fine particle size as a discrete included colored compound, wherein the inorganic oxide is chromic oxide having an average particle size ($D_{50}$ value) in the range of from 0.1 to 3.0 μm.

Inclusion pigments having zirconium sulfate as a casing or wall component and containing included colored oxides are known; see, for example, AT-B 319,133; EP-B 0,294,664; DE-A 3,906,819; and DE-A 3,906,821, each of which are entirely incorporated herein by reference. DE-A 3,906,819 and DE-A 3,906,821 correspond to U.S. Pat. Nos. 5,019,169 and 5,035,746, respectively. These patents are entirely incorporated herein by reference. Furthermore, U.S. Pat. No. 5,008,223 directed to similar inclusion pigments is also entirely incorporated herein by reference. However, the known inclusion pigments do not contain included chromic oxide. Inclusion of chromic oxide having a fine particle size has not been described in the art because non-included chromium oxide shows a suitable and sufficient enamel stability. Preferred inclusion pigments containing chromic oxide have a narrow particle size spectrum; 90% of the $Cr_2O_3$ particles should be below 5 μm and preferably 95% should be below 3 μm. Preferred inclusion pigments are characterized by a particle size spectrum between 0.5 and 30 μm, wherein between about 3 and 20 μm is particularly preferred. Particularly advantageous inclusion pigments show a $D_{50}$ value between 8 an 15 μm and contain less than 5% of fine particles below 3 μm. The $D_{50}$ values and particle size distribution can be determined by usual methods, for example, by means of laser-diffraction.

DETAILED DESCRIPTION OF THE INVENTION

The inclusion pigments according to the present invention can be prepared by fusing a mixture of a source of zirconium dioxide, a source of silicon dioxide, the inorganic oxide to be included and conventional mineralizators at a temperature between 800° C. and 1300° C. for a period of time between 0.5 and 8 hours. The inorganic oxide used is chromic oxide having an average particle size ($D_{50}$ value) of from 0.1 to 3.0 μm, generally in an amount of from 10 to 20% by weight, related to the weight of the mixture to be fused.

It is unexpected that the inclusion of chromic oxide having a fine particle size and a $D_{50}$ value between 0.1 and 3 μm (particularly between 0.5 and 2 μm) in zirconium silicate formed in a solid phase reaction would be successful and result in the formation of brilliant light green inclusion pigments. The pigments have $D_{50}$ values generally between 3 μm and 20 μm and possess improved properties relating to the technology of applying the pigment to the ceramic. According to the process disclosed in AT-B 319,133, it is impossible to include every conceivable colored compound in an amount required to act as a pigment during the process of forming the zirconium silicate casing substance.

In many instances, the coloring components can retard or prevent the formation of $ZrSiO_4$ from $ZrO_2$ and $SiO_2$ or the desired pigment properties are either not achieved at all or are achieved only to an incomplete extent.

According to the process of the present invention, examples of the zirconium dioxide source include: zirconium dioxide, particularly $ZrO_2$ having $D_{50}$ values between 1 and 10 μm; zirconyl hydrate, which may be prepared by the hydrolysis of zirconyl halides; or tetraalkoxy zirconares. Zirconium dioxide is the particularly preferred zirconium dioxide source. Examples of the source of silicon dioxide are as follows: silicon dioxide, preferably silicon dioxide having a fine particle size; a zeolite rich in $SiO_2$; an alkyoxy silanes; and an alkoxy siloxanes. The source of $ZrO_2$ and the source of $SiO_2$ are preferably used in approximately equimolar amounts, i.e., in a ratio suitable to form $ZrSiO_4$.

The fusing procedure is preferably carried out at a temperature between 1000° C. and 1300° C. under reducing or oxidizing conditions.

Mineralizator compounds conventionally used in $ZrSiO_4$ formation can be applied. For example, halogenides, particularly fluorides and chlorides of alkali and/or alkaline earth metals and alkali silicofluorides may be used as mineralizators. The product is ground in a manner known after the fusing procedure. The mineralizator can be washed out, if desired.

The inclusion pigments of the present invention may be used without any difficulties for the preparation of brilliant light green ceramic decorations, as mentioned above. When using finely ground chromic oxide, difficulties in the application and problems due to unsharp contours because of spreading were known to occur. These drawbacks are eliminated with the aid of the present invention. The inclusion in accordance with the invention can be readily applied by means of conventional pressing methods, for example, by direct pressing, such as by tampon pressing or by sieve pressing; or by indirect pressing, such as by stripping forming means. Such application techniques are well known to those skilled in the art. In a particularly preferred aspect of the invention, ceramic decorations may be prepared by direct pressing using the inclusion pigments of the present invention. The pigments of the present invention may be used for the coloration of enamels, glazes and for ceramic decoration colors. The pigments may also be used for decoration or coloration of non-ceramic articles, for example, plastics, lacquers and press colors.

The palette of inclusion pigments based on zirconium silicate can be broadened with the aid of the brilliant green inclusion pigments of the present invention. This constitutes an advantage in the decoration process because such pigments can be adapted with a single adapting medium irrespective of the included coloring component. Thus, it is no longer necessary to adapt the recipe to the given certain color. The preparation of multicolored pigments has become easier with the aid of a palette of pigments in which the different pigments show identical surface properties.

In addition to the above advantages relating to the colorization and application technology, the pigments in accordance with the present invention are less toxic. A further advantage resides in the fact that by including $Cr_2O_3$ in a $ZrSiO_4$ casing, oxidation of $Cr_2O_3$ to chromates takes place only to a very limited extent, even under strongly oxidizing conditions. Thus, drain is reduced to a minimum. The temperature stability of the pigments according to the present invention greatly exceeds 1400° C., and for this reason, the inclusion pigments of the present invention are suitable for the preparation of decorated porcelain in a firing process; i.e., when the firing of the porcelain and the decoration takes place simultaneously.

The invention will be more particularly described in conjunction with the following example. This example should not be construed as limiting the invention.

A mixture having the following composition is prepared:

| | |
|---|---|
| 51.4 g | $ZrO_2$ |
| 25.7 g | $SiO_2$ |
| 14.8 g | $Cr_2O_3$ ($D_{50}$ value = 1 μm) |
| 2.5 g | NaF |
| 2.0 g | NaCl |

The mixture is intensively ground in a ball mill. The mixture is then fused in a chamotte crucible at a temperature of 1100° C. for 2 hours. The fused product is then ground to the desired particle size distribution.

Direct pressing is carried out by applying the pigment dispersed in an organic medium onto an engraved noble metal plate with the aid of a color blade or color knife, removing the decoration by means of a silicon tampon and pressing the same onto a porcelain carrier and finally over-enamelling and firing. When using non-included $Cr_2O_3$ pigments with a fine particle size, spreading is observed. On the other hand, when using the included pigments of the present invention, the decoration preserves the sharp contours and no spreading takes place.

While the invention has been described in conjunction with this particular example, those skilled in the art will recognize that various modifications may be made without departing from the spirit and scope of the invention, as defined in the claims.

The priority document, German Patent Application No. P 41 08 624.4, filed in Germany on Mar. 16, 1991 is relied on and entirely incorporated herein by reference.

We claim:

1. A brilliant light green inclusion pigment comprising:

zirconium silicate as a casing component and an inorganic oxide having a fine particle size as a discrete, included colored compound, wherein the inorganic oxide is chromic oxide having a $D_{50}$ average particle size value in the range of 0.1 to 3.0 μm, and wherein the pigment has a color value, as measured in the CIE-Lab-system, in the range of L=30 to 35, a=−15 to −17 and b=13 to 16, measured with a 5% by weight coloration in a transparent enamel and by burning or firing at 1060° C.

2. A process for preparing a brilliant light green inclusion pigment having zirconium silicate as a casing component and an inorganic oxide having a fine particle size as a discrete, included colored compound, comprising:

fusing a mixture of a zirconium dioxide source, a silicon dioxide source, an inorganic oxide having a fine particle size to be included and a mineralizator, at a temperature in the range of 800° C. to 1300° C., for a period of from 0.5 to 8 hours, wherein the inorganic oxide is chromic oxide having a $D_{50}$ average particle size value in the range of 0.1 and 3.0 μm, wherein the pigment has a color value, as measured in the CIE-Lab-system, in the range of L=30 to 35, a=−15 to −17 and b=13 to 16, measured with a 5% by weight coloration in a transparent enamel and by burning or firing at 1060° C.

3. The process according to claim 2, wherein the zirconium dioxide source is $ZrO_2$, the silicon dioxide source is $SiO_2$, and the temperature is in the range of 1000° C. to 1300° C.

4. A process for forming a colored ceramic, comprising:

providing a ceramic with an inclusion pigment, said inclusion pigment having zirconium silicate as a casing component and an inorganic oxide having a fine particle size as a discrete, included colored compound, wherein the inorganic oxide is chromic oxide having a $D_{50}$ average particle size value in the range of 0.1 to 3.0 μm, to thereby color the ceramic with a brilliant, light green color, wherein the pigment has a color value, as measured in the CIE-Lab-system, in the range of $L=30$ to 35, $a=-15$ to $-17$ and $b=13$ to 16, measured with a 5% by weight coloration in a transparent enamel and by burning or firing at 1060° C.

5. The process according to claim 4, wherein the pigment is provided onto the ceramic by a direct pressing process.

6. A brilliant light green inclusion pigment comprising:

zirconium silicate as a casing component and an inorganic oxide having a fine particle size as a discrete, included colored compound, wherein the inorganic oxide is chromic oxide having a $D_{50}$ average particle size value in the range of 0.1 to 3.0 μm, wherein the inclusion pigment is produced according to a process which consists essentially of:

fusing a mixture of a zirconium dioxide source, a silicon dioxide source, an inorganic oxide having a fine particle size to be included and a mineralizator, at a temperature in the range of 800° C. to 1300° C., for a period of from 0.5 to 8 hours, wherein the inorganic oxide is chromic oxide having a $D_{50}$ average particle size value in the range of 0.1 and 3.0 μm.

7. The inclusion pigment according to claim 6, wherein the zirconium dioxide source is $ZrO_2$, the silicon dioxide source is $SiO_2$, and the temperature is in the range of 1000° C. to 1300° C.

8. A process for preparing an inclusion pigment having zirconium silicate as a casing component and an inorganic oxide having a fine particle size as a discrete, included colored compound, consisting essentially of:

fusing a mixture of a zirconium dioxide source, a silicon dioxide source, an inorganic oxide having a fine particle size to be included and a mineralizator, at a temperature in the range of 800° C. to 1300° C., for a period of from 0.5 to 8 hours, wherein the inorganic oxide is chromic oxide having a $D_{50}$ average particle size value in the range of 0.1 and 3.0 μm.

9. The process according to claim 8, wherein the zirconium dioxide source is $ZrO_2$, the silicon dioxide source is $SiO_2$, and the temperature is in the range of 1000° C. to 1300° C.

10. A colored ceramic product produced by the process of claim 4, wherein the product includes a brilliant light green color, and wherein sharp contours are maintained between the brilliant light green colored portions of the product and portions which are not brilliant light green colored.

11. A colored ceramic product produced by the process of claim 5, wherein the product includes a brilliant light green color, and wherein sharp contours are maintained between the brilliant light green colored portions of the product and portions which are not brilliant light green colored.

* * * * *